(12) United States Patent
Seigneur

(10) Patent No.: US 12,090,929 B2
(45) Date of Patent: Sep. 17, 2024

(54) INSTRUMENTED MOTOR VEHICLE REAR SPOILER

(71) Applicant: Renault s.a.s., Boulogne-Billancourt (FR)

(72) Inventor: Quentin Seigneur, Versailles (FR)

(73) Assignee: Renault s.a.s., Boulogne-Billancourt (FR)

( * ) Notice: Subject to any disclaimer, the term of this patent is extended or adjusted under 35 U.S.C. 154(b) by 241 days.

(21) Appl. No.: 17/626,044

(22) PCT Filed: Jun. 30, 2020

(86) PCT No.: PCT/EP2020/068338
§ 371 (c)(1),
(2) Date: Jan. 10, 2022

(87) PCT Pub. No.: WO2021/004831
PCT Pub. Date: Jan. 14, 2021

(65) Prior Publication Data
US 2022/0258677 A1    Aug. 18, 2022

(30) Foreign Application Priority Data
Jul. 11, 2019 (FR) ..................... 1907818

(51) Int. Cl.
*B62D 35/00* (2006.01)
*B60R 11/02* (2006.01)

(52) U.S. Cl.
CPC ........ *B60R 11/0258* (2013.01); *B62D 35/007* (2013.01)

(58) Field of Classification Search
CPC ............... B62D 35/001; B62D 35/007; B60R 11/0258; Y02T 10/82; H01Q 1/3233; H01Q 1/103; H01Q 1/3275
(Continued)

(56) References Cited

U.S. PATENT DOCUMENTS

| 7,746,281 | B2 * | 6/2010 | Yamada | H01Q 1/1207 343/711 |
| 8,952,854 | B2 * | 2/2015 | Fellows | H01Q 5/35 343/713 |
| D828,274 | S * | 9/2018 | Itou | D12/223 |

(Continued)

FOREIGN PATENT DOCUMENTS

| GB | 2578597 A | * | 5/2020 | ............. B60R 11/02 |
| JP | 2015-100011 A | | 5/2015 | |
| WO | WO 2016/026750 A1 | | 2/2016 | |

OTHER PUBLICATIONS

International Search Report issued on Sep. 29, 2020 in PCT/EP2020/068338 filed on Jun. 30, 2020, 2 pages.

(Continued)

*Primary Examiner* — Dennis H Pedder
(74) *Attorney, Agent, or Firm* — Oblon, McClelland, Maier & Neustadt, L.L.P.

(57) ABSTRACT

A motor vehicle rear spoiler includes: an elongate external wall having a front edge and an opposite rear edge, and an internal housing; two substantially parallel longitudinal mounting brackets situated inside the internal housing; and a signal receiving device including a receiving plate having two opposite borders and a receiving casing installed on the plate between the opposite borders. The two opposite borders are designed to be secured respectively to the two mounting brackets. The longitudinal mounting brackets each include a slideway for respectively receiving the opposite borders of the receiving plate in a sliding manner.

7 Claims, 2 Drawing Sheets

(58) Field of Classification Search
USPC .................................... 296/180.1; 343/711
See application file for complete search history.

(56) References Cited

U.S. PATENT DOCUMENTS

| | | |
|---|---|---|
| 11,069,961 B2 * | 7/2021 | Sampo .................. H01Q 21/28 |
| 2006/0262018 A1 | 11/2006 | Mikami et al. |
| 2008/0030414 A1 | 2/2008 | Yamada |
| 2017/0229767 A1 | 8/2017 | Suffolk et al. |
| 2017/0279181 A1 | 9/2017 | Niihara et al. |

OTHER PUBLICATIONS

French Preliminary Search Report (with English translation of Categories of Cited Documents) issued on Dec. 19, 2019 in French Application 1907818 filed on Jul. 11, 2019, 3 pages.

* cited by examiner

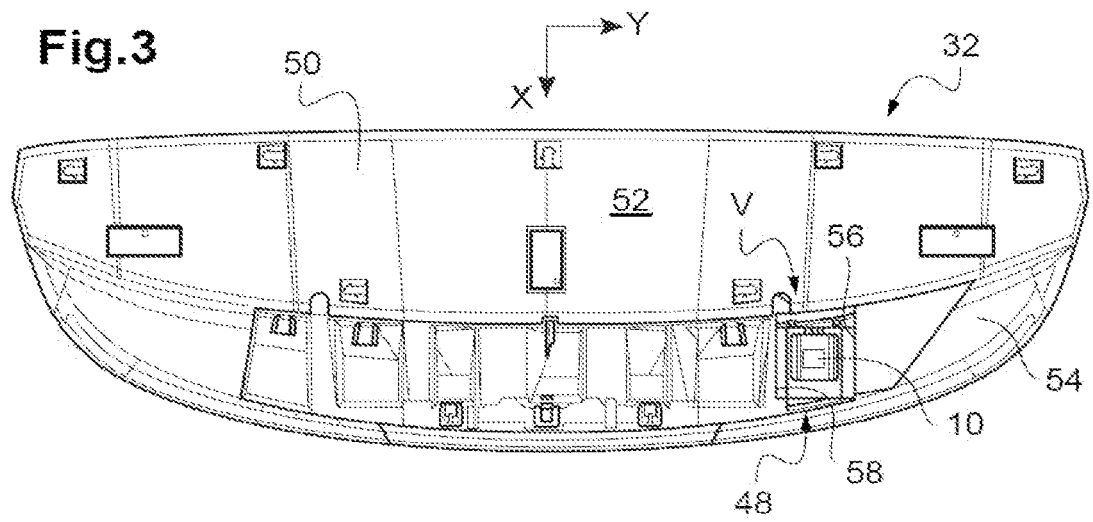
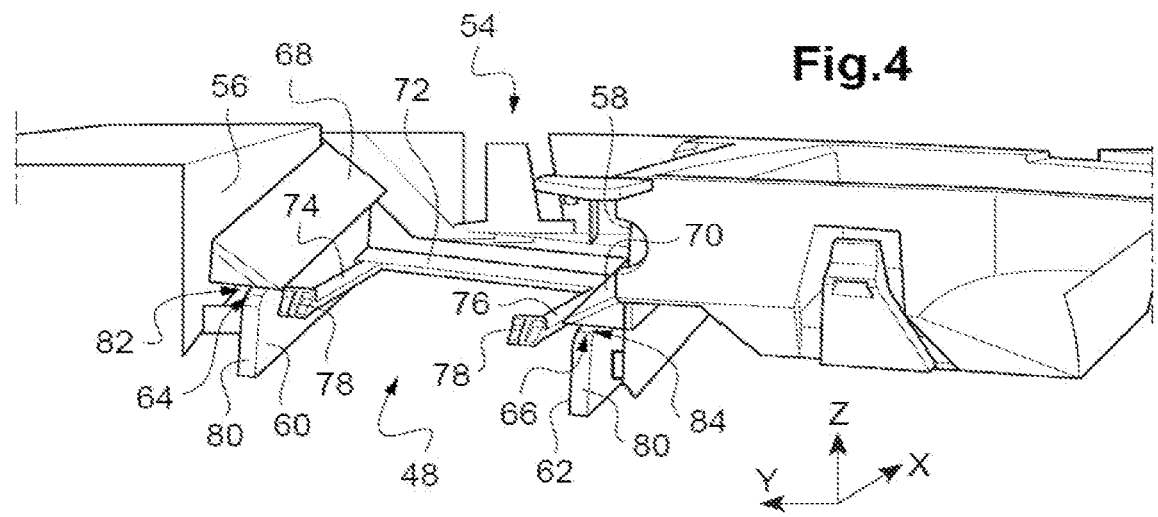
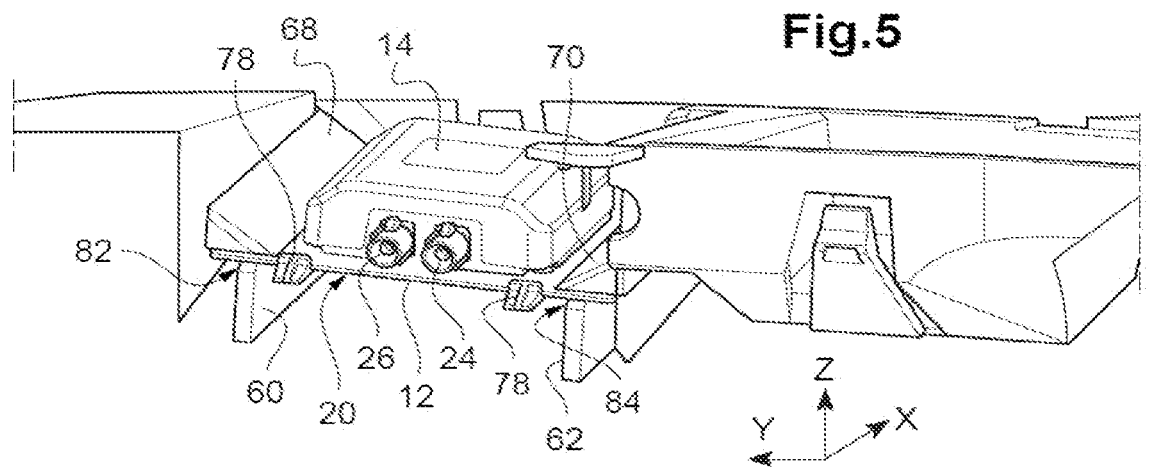

INSTRUMENTED MOTOR VEHICLE REAR SPOILER

TITLE

Background

The subject of the present invention relates to a motor vehicle rear spoiler comprising a reception device that makes it possible to locate the position of the motor vehicle which includes it, and, at the same time, to supply its speed and the time, using a satellite positioning system.

The rear spoiler of the motor vehicles is a surface element of their bodywork that makes it possible to enhance the flow of the airstreams on the surface of this bodywork and to reduce the drag.

It is well known to install a reception device in the rear spoiler of a motor vehicle in order to obtain the best possible reception of the signals coming from the satellites situated directly above the vehicle.

The rear spoiler targeted is that which extends in the extension of the roof of the vehicle overhanging the rear tailgate. No metal element is then interposed between the reception device and the positioning signals coming from the satellites, and, thereby, the reading of the positioning is not affected by error.

Reference will notably be able to be made to document JP10329615A, which describes such a rear spoiler equipped with a GPS reception antenna, GPS standing for "Global Positioning System".

The rear spoiler comprises an oblong outer wall molded in a polymer material, having a front edge continuously extending the roof and an opposite rear edge running along the tailgate. The oblong outer wall extends from the front to the rear forming a return, which defines an internal housing. Also, said oblong outer wall is designed to extend in a transverse direction of the motor vehicle, over a width equal to that of the roof.

Inside the internal housing, two parallel longitudinal fixing supports molded with the wall extend in a transverse direction of the vehicle and receive a signal reception device. The latter comprises a reception plate having two opposite borders and a reception unit installed on the plate between the opposite borders. The reception device is installed inside the internal housing in such a way that the two opposite borders respectively bear on the two fixing supports to which they are screwed.

The reception plate is then held in fixed position in a horizontal plane. The reception unit is oriented upward, while a link cable extends downward to join the display and control members of the motor vehicle.

Mounting and dismantling such a reception device is relatively lengthy and, consequently, costly.

BRIEF SUMMARY

So, one problem that is raised and that the present invention aims to resolve is to provide a rear spoiler that allows for a more economical mounting of the reception device.

In order to resolve this problem, a motor vehicle rear spoiler is proposed, comprising: an oblong outer wall having a front edge and an opposite rear edge, and an internal housing delimited by said oblong outer wall, said oblong outer wall being designed to extend in a transverse direction of a motor vehicle; two substantially parallel longitudinal fixing supports situated inside said internal housing; and a signal reception device comprising a reception plate having two opposite borders and a reception unit installed on said plate between said opposite borders, said two opposite borders being designed to be secured respectively to said two fixing supports. Said longitudinal fixing supports each comprise a runner, for respectively slidingly receiving said opposite borders of said reception plate.

Thus, one feature of the invention lies in the implementation of runners on each of the longitudinal fixing supports so as to be able to easily install the reception device by engaging the two opposite borders of the reception plates respectively in the two runners. The reception plate which plays a role in the reception of the signals coming from the satellites is thus exploited to link it to the support with no device other than the runners. As will be explained in more detail hereinbelow in the description, the profile of the runners and the thickness of the transmission plate are such that the two opposite borders are force-fitted in the runners.

Advantageously, the runners of said fixing supports extend opposite one another. Also, the two opposite borders of the reception plate extend in the same plane and they are oriented opposite one another so as to be able to be respectively engaged in the two opposite runners.

Furthermore, said runners each comprise, particularly advantageously, an abutment stopping translation of said opposite borders. The runners are parallel to one another and their lengths are equal. Also, they each comprise a stop abutment at one of their ends. That way, when the opposite borders of the reception plate are engaged in the runners, at their other end, they are driven in translation to come against the stop abutments. That way, the relative position of the reception plate and consequently of the reception device with respect to the runners and more broadly to the rear spoiler, is perfectly determined.

Also, and according to a particularly advantageous mode of implementation of the invention, said longitudinal fixing supports comprise at least one elastically deformable tongue provided with a stop lug for holding said reception plate in position fixed between said stop abutments and said lug. Thus, the elastically deformable tongue provided with its lug extends between the two runners opposite the stop abutments. When the opposite borders of the reception plate are engaged in the two opposite runners, the elastically deformable tongue is moved away from its position of rest between the runners. Once the opposite borders of the plate bear against the stop abutment, the elastically deformable tongue reverts to its position of rest, while the lug extends in front of the edge of the reception plate. The reception plate is then captive between the stop abutments and the lug as will be explained hereinbelow. Furthermore, the reception device can easily be disengaged from the runners by moving the elastically deformable tongue away from its position and, thereby, by moving away the lug, then by driving the reception plate in translation to disengage it from the runners.

Preferentially, the fixing supports comprise two tongues extending parallel and respectively close to the runners; each of the tongues being equipped with a stop lug.

According to a particularly advantageous embodiment of the invention, said stop abutments are oriented toward said rear edge, whereas said lug is oriented toward said front edge.

In addition, the rear spoiler further comprises, preferentially, a framework, and said outer wall bears on said framework. The framework thus makes it possible to hold the outer wall in fixed position, which outer wall can then have a small thickness.

Preferentially, said framework and said longitudinal supports are molded together in a single piece in a polymer material. For example, the framework and the supports are molded in ABS, the acronym for the thermoplastic polymer: acrylonitrile butadiene styrene.

Furthermore, the runners of said fixing supports extend in a direction substantially at right angles to said transverse direction. In other words, the runners extend from the front edge to the rear edge and thus in the longitudinal direction of the motor vehicle.

Moreover, the rear spoiler further comprises, on the one hand, another internal housing delimited by said oblong outer wall and two other substantially parallel longitudinal fixing supports situated inside said other internal housing and each comprising another runner, and, on the other hand, another signal reception device comprising another reception plate having two other opposite borders and another reception unit installed on said other plate between said other opposite borders, said other opposite borders being able to slide in said other runners. That way, the rear spoiler comprises two reception devices, making it possible to ensure a greater reliability of the information on the position of the vehicle, its speed and the time.

BRIEF DESCRIPTION OF THE DRAWINGS

Other particular features and advantages of the invention will emerge on reading the description given hereinbelow of particular embodiments of the invention, given in an indicative but nonlimiting manner, with reference to the attached drawings in which:

FIG. 3 is a top schematic view of the subject of the invention;

FIG. 4 is a partial perspective schematic view of another element of the subject of the invention; and, FIG. 5 is a partial schematic view of the subject of the figure [FIG. 4] equipped with the subject of the figure [FIG. 1], according to the arrow V illustrated in the figure [FIG. 3].

DETAILED DESCRIPTION

Figure 1:
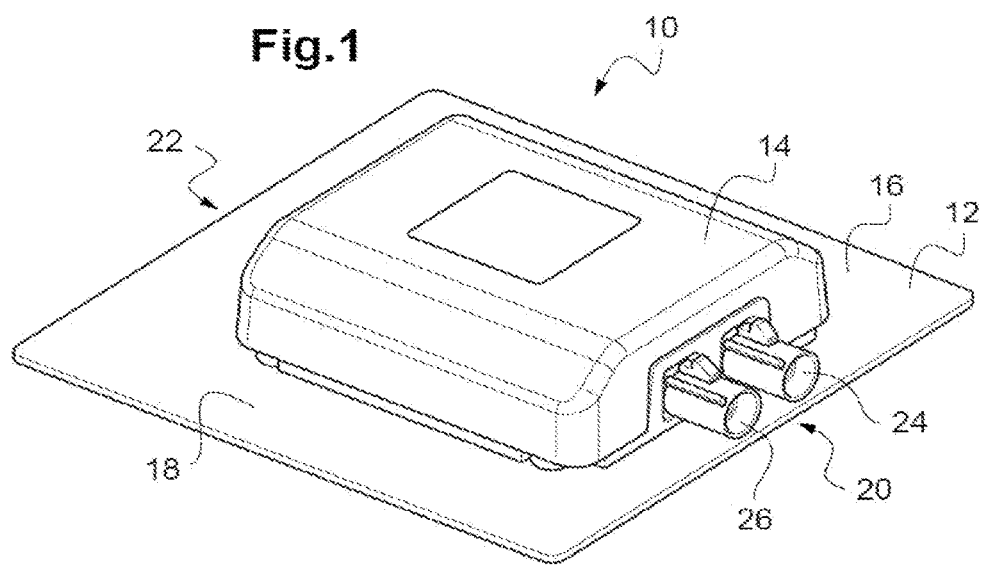
FIG. 1 is a perspective schematic view of an element of the subject of the invention.

FIG. 1 shows a signal reception device 10 comprising a reception plate 12 and a reception unit 14. The reception plate 12 is of square form and its dimensions here are, for example, 90 mm×90 mm, while its thickness is 2 mm. The reception plate 12 can have greater thicknesses, but also less than 2 mm. It is made of metal so that the electromagnetic signals coming from artificial satellites can interact with it.

It has two opposite lateral borders 16, 18 and an anterior edge 20 opposite a posterior edge 22. Also, the reception unit 14, with a thickness of around 20 mm, is mounted in fixed position on the reception plate 12, at the center between the two opposite lateral borders 16, 18. The reception unit 14 comprises two connectors 24, 26 emerging toward the anterior edge 20, to be able to connect it to coaxial cables extending to the display and control instruments of a motor vehicle.

The signal reception device 10 is, here, a "GNSS patch", in other words, a reception element that makes it possible to receive information elements on its position, its speed and the time, using a set of satellites moving around the earth; "GNSS" corresponding to the initials of "Global Navigation Satellite System".

Figure 2:
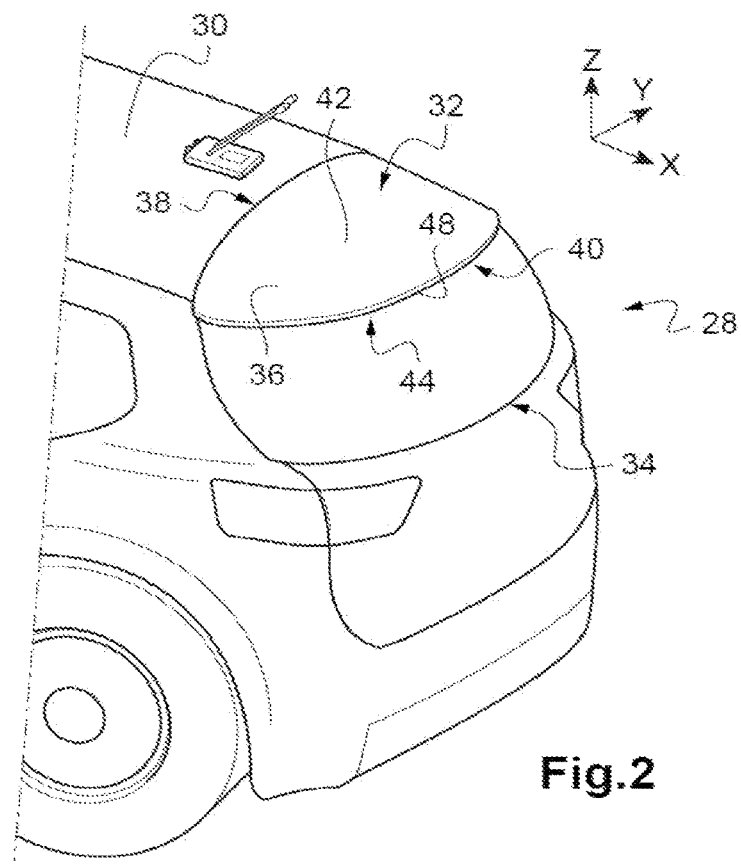
FIG. 2 is a partial perspective schematic view of the rear of a motor vehicle provided with the subject of the invention.

Reference will now be made to FIG. 2, showing the rear of a motor vehicle 28 having a roof 30 extended toward the rear according to the component X of a rear spoiler 32 overhanging a rear tailgate 34. Thus, the rear spoiler 32 extends transversely over the width of the roof 30 that it extends. It comprises an oblong outer wall 36 which has a front edge 38, which comes edge-to-edge with the roof 30, and a rear edge 40 running along the tailgate 34. Also, the oblong outer wall 36 has a part forming a convex side 42 opposite a part forming a concave side 44; the two parts 42, 44 being delimited from one another by a trailing edge 46. Thus, the signal reception device 10, described level in the figure [FIG. 1] is installed inside a first internal housing 48 of the rear spoiler 32 that is illustrated in top view in the figure [FIG. 3] without its outer wall but showing a frame 50 on which it rests.

The framework 50 has a front part 52 and a rear part 54 set back with respect to the front part 52. The first internal housing 48 is situated in the rear part 54 between two lateral partitions 56, 58.

Reference will now be made to the figure [FIG. 4] partially showing, according to the arrow V represented in the figure [FIG. 3], the rear part 54 and the two lateral partitions 56, 58 then defining the first internal housing 48.

Thus, the two lateral partitions 56, 58 extend longitudinally parallel to one another according to the longitudinal axis X. They are spaced apart by a distance substantially greater than 90 mm. Also, they are respectively provided with two flat profile sections 60, 62 extending parallel to one another and each having a bearing edge 64, 66. And they are also equipped with two prismatic profile sections 68, 70 extending overhanging the bearing edges 64, 66 at a distance of 2 mm. The two flat profile sections 60, 62 are, here, linked by a bridge 72. And from this bridge 72 extend two flexible tongues 74, 76 that are respectively parallel and situated close to the two flat profile sections 60, 62 substantially below the level of their bearing edge 64, 66. The flexible tongues 74, 76 extend according to a negative component of the longitudinal axis X and they are each terminated by a stop lug 78 protruding above the level of the bearing edge 64, 66 of the flat profile sections 60, 62, when the flexible tongues 74, 76 are at rest. Furthermore, stop lugs 78 extend in line with the front ends 80 of the two flat profile sections 60, 62. That way, the two bearing edges 64, 66 respectively covered by and at a distance from their two prismatic profile sections 68, 70 then define two runners opposite one another 82, 84.

Furthermore, and particularly advantageously, the two flat profile sections 60, 62, the two prismatic profile sections 68, 70, the bridge 72 and the two flexible tongues 74, 76 respectively terminated by their stop lug 78, are molded in a single piece with the rear part 54 and the front part 52 on the two lateral partitions 56, 58. The assembly is for example molded in ABS.

Thus, the tongues 74, 76 exhibit a certain flexibility, and they can be moved apart opposite the two prismatic profile sections 68, 70 so as to be able to engage the posterior edge 22 and the two opposite borders 16, 18 of the reception plate 12 in the two runners, respectively, 82, 84, between the bearing edges 64, 66 and the prismatic profile sections 68, 70, as illustrated in the figure [FIG. 5].

Since the two lateral partitions 56, 58 are moved apart from one another according to the transverse axis Y by a value corresponding to the width of the reception plate and since the prismatic profile sections 68, 70 are spaced apart from the bearing edges 64, 66 according to the vertical axis Z by a distance equal to the thickness of the reception plate 12, and since, in addition, all these elements are made of polymer material, the two opposite lateral borders 16, 18 of the reception plate 12 can be driven by force between these elements, while the polymer materials deform significantly. Also, at the end of the bearing edges 64, 66, opposite the front ends 80, stop abutments that are not represented make it possible to stop the reception plate 12 when the posterior edge 22 comes precisely against the stop abutments. In the longitudinal direction X, the stop lugs 78 are situated at a distance from the stop abutments substantially greater than the length of the reception plate 12, i.e. 90 mm. That way, when the posterior edge 22 comes against the stop abutments, the tongues 74, 76 revert to their position of equilibrium, while the lugs 78 extend facing the anterior edge 20 of the reception plate 12 so as to hold it captive. That way, the reception plate 12 and the reception unit 14 that it supports are perfectly held in fixed position with respect to the framework 50 and, more generally, to the rear spoiler 32.

Next, the coaxial cables of the display and control instruments can be connected to the connectors 24, 26.

Also, and conversely, the reception plate 12 can easily be extracted from the runners 82, 84 by exerting a force on the lugs 78, in the vertical direction Z and, thereby, by moving the tongues 74, 76 away from the reception plate 12. The anterior edge 20 of the reception plate 12 then escapes from the reach of the lugs 78. The reception plate 12 can then be slidingly driven to be extracted.

Thus, the reception device 10 is equally as easy to install as it is to extract.

Moreover, according to another embodiment of the invention that is not represented, the rear spoiler further comprises a second internal housing, situated for example opposite the first with respect to a median plane of the rear spoiler. Also the latter comprises two second substantially parallel longitudinal fixing supports situated inside the second internal housing, each with a second runner. And a second signal reception device comprises a second reception plate having two second opposite borders and a second reception unit installed on the second plate between the second opposite borders. Also, the second opposite borders can slide in the second runners.

The invention claimed is:

1. A motor vehicle rear spoiler comprising:
   an oblong outer wall having a front edge and an opposite rear edge, and an internal housing delimited by said oblong outer wall, said oblong outer wall being configured to extend in a transverse direction of a motor vehicle;
   two substantially parallel longitudinal fixing supports situated inside said internal housing; and
   a signal reception device comprising a reception plate having two opposite borders and a reception unit installed on said plate between said opposite borders, said two opposite borders being configured to be secured respectively to said two fixing supports,
   wherein said longitudinal fixing supports each comprise a runner, for respectively slidingly receiving said opposite borders of said reception plate, the runners being located a top edge of said fixing supports,
   wherein the fixing supports are linked by a bridge extending from an inner surface of each of said fixing supports, the bridge being positioned below the top edge of said fixing supports, and
   wherein at least one elastically deformable tongue extends from the bridge at a first end, the at least one elastically deformable tongue being provided with a stop lug at a second end, the stop lug being positioned higher than the first end to hold said reception plate.

2. The rear spoiler as claimed in claim 1, wherein the runners of said fixing supports extend opposite one another.

3. The rear spoiler as claimed in claim 1, further comprising a framework, wherein said outer wall bears on said framework.

4. The rear spoiler as claimed in claim 3, wherein said framework and said longitudinal supports are molded together in a single piece in a polymer material.

5. The rear spoiler as claimed in claim 1, wherein the runners of said fixing supports extend in a direction substantially at right angles to said transverse direction.

6. The rear spoiler as claimed in claim 1, further comprising:
   another internal housing delimited by said oblong outer wall and two other substantially parallel longitudinal fixing supports situated inside said other internal housing and each comprising another runner; and
   another signal reception device comprising another reception plate having two other opposite borders and another reception unit installed on said other plate between said other opposite borders, said other opposite borders being configured to slide in said other runners.

7. The rear spoiler as claimed in claim 1, further comprising upper longitudinal fixing supports situated inside said internal housing and positioned above said longitudinal fixing supports, wherein said upper longitudinal fixing supports each comprise a downwardly converging wall for respectively slidingly receiving said opposite borders of said reception plate.

* * * * *